United States Patent
Kump

(10) Patent No.: US 10,494,048 B2
(45) Date of Patent: *Dec. 3, 2019

(54) BIKE FRAME WITH FIXED BOTTLE OPENER GUSSET

(71) Applicant: Scott Kump, Gilbert, AZ (US)

(72) Inventor: Scott Kump, Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,399

(22) Filed: Jan. 23, 2018

(65) Prior Publication Data

US 2018/0162481 A1    Jun. 14, 2018

Related U.S. Application Data

(63) Continuation-in-part of application No. 15/045,144, filed on Feb. 16, 2016, now Pat. No. 9,919,759, which is a continuation-in-part of application No. 14/597,118, filed on Jan. 14, 2015, now Pat. No. 9,284,010.

(60) Provisional application No. 62/001,528, filed on May 21, 2014.

(51) Int. Cl.
| | |
|---|---|
| *B62K 3/02* | (2006.01) |
| *B62K 19/40* | (2006.01) |
| *B62K 19/28* | (2006.01) |
| *B67B 7/16* | (2006.01) |
| *B62K 19/20* | (2006.01) |

(52) U.S. Cl.
CPC .............. *B62K 19/40* (2013.01); *B62K 3/02* (2013.01); *B62K 19/28* (2013.01); *B62K 19/20* (2013.01); *B67B 7/16* (2013.01)

(58) Field of Classification Search
CPC .......... B62K 19/40; B62K 3/02; B62K 19/06; B62K 19/28; B62K 3/04; B62K 19/20; B62J 99/00; B67B 7/16
See application file for complete search history.

(56) References Cited

U.S. PATENT DOCUMENTS

| | | | |
|---|---|---|---|
| 2,132,317 A | 10/1938 | Pease | |
| 2,151,533 A | 3/1939 | Schwinn | |
| D118,611 S | 1/1940 | Alexander | |
| 8,585,070 B2 | 11/2013 | Beale | |
| 2012/0061941 A1 | 3/2012 | Choi | |
| 2016/0023875 A1* | 1/2016 | Lenig | B67B 7/16 53/492 |
| 2017/0233027 A1* | 8/2017 | DeGray | B62K 19/40 29/525.01 |

* cited by examiner

*Primary Examiner* — Jacob D Knutson
*Assistant Examiner* — Marlon A Arce

(57) ABSTRACT

A bike frame with a fixed bottle opener gusset is a bicycle frame with at least a crossbar, a vertical-frame bar, and a fixed bottle opener gusset fixedly and integrally located at an intersection of the crossbar and said vertical frame-bar. The design of the frame provides added strength and increased frame life with rugged service while further providing a user with a functional bottle opener that is useful for removing a cap from a bottle when the user is riding or not riding the bicycle.

20 Claims, 4 Drawing Sheets

BIKE FRAME WITH FIXED BOTTLE OPENER GUSSET

CROSS-REFERENCE TO RELATED APPLICATION

The present application is related to and claims priority from prior provisional application Ser. No. 62/001,528 filed May 21, 2014, prior non-provisional utility patent application Ser. No. 14/597,118 filed Jan. 14, 2015, and prior continuation in part application Ser. No. 15/045,144 filed Feb. 16, 2016, which applications are incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of bicycles and more specifically relates to a tube bike frame with a fixed bottle opener gusset.

2. Description of Related Art

Bicycles, or bikes, come in a variety of shapes and sizes and are designed and used for a variety of purposes. For example, bikes may be used for leisure activity, for exercise, for touring, for entertainment, for sport, for business, for cargo hauling, for commuting, and for general transportation, etc. Typical bicycles are often classified as one or more of BMX, road, cyclocross, racing, track, touring, utility, commuter, mountain, off-road, downhill, time-trial, triathlon, cruiser, beach cruiser, etc.; however, such classifications, or types, of bicycles are certainly not exhaustive, and a given bicycle may be used for a variety of purposes regardless of a so-called classification or type for which it is designated or designed to be used. Many bike frames may not provide longevity in use because of their weak design. Other frames may be durable but are heavy and cumbersome. A solution that provides sufficient strength, durability, ease of manufacture and pleasant aesthetics is desirable.

Several attempts have been made to solve the above-mentioned problems such as those found in: U.S. Pat. No. 2,151,533 to Frank W. Schwinn; 2012/0061941 to Robert Choi and Barley A. Forsman; U.S. Pat. No. 2,132,317 to Earl E. Pease; U.S. Pat. No. 8,585,070 to Luke Beale; and D118,611 to John R. Alexander. This art is representative of bicycle frames. However, none of the above inventions and patents, taken either singly or in combination, is seen to describe the invention as claimed.

Preferably, a bicycle frame should provide increased frame strength for rugged service with reduced wind resistance, and yet, would operate reliably and be manufactured at a modest expense. Thus, a need exists for a reliable tube bike frame with bottle opener gusset system to avoid the above-mentioned problems.

BRIEF SUMMARY OF THE INVENTION

In view of the foregoing disadvantages inherent in the known bicycle frame art, the present invention provides a novel bike frame with fixed bottle opener gusset. The general purpose of the present invention, which will be described subsequently in greater detail, is to provide a rigid frame including a crossbar having a cross-section and a vertical frame-bar, and further comprising a fixed bottle opener gusset integrally located at an intersection of the crossbar and the vertical frame-bar for adding bottle opening functionality to a bike and for increasing stability and longevity of the frame.

The present invention holds significant improvements and serves as a desirable bike frame having a fixed bottle opener gusset. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, bike frame with fixed bottle opener gusset, constructed and operative according to the teachings of the present invention.

The various embodiments of the present invention will hereinafter be described in conjunction with the appended drawings, wherein like designations denote like elements.

DETAILED DESCRIPTION

Figure 1A:
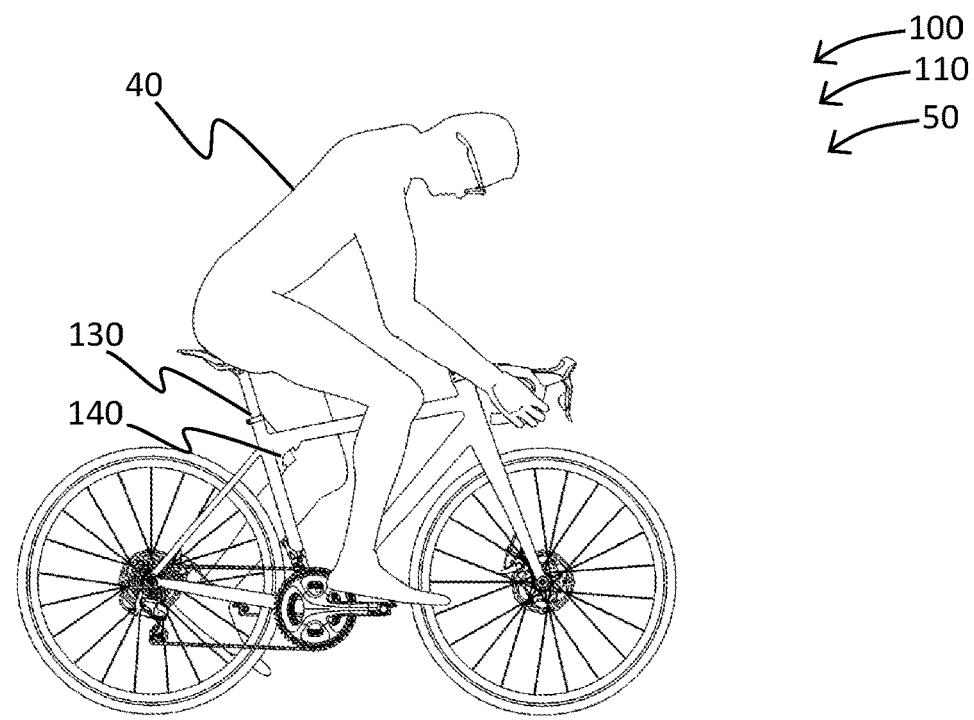
FIG. 1A shows a perspective view illustrating an 'in-use' condition of a cycle having a bike frame with a fixed bottle opener gusset according to an embodiment of the present invention.

As discussed above, embodiments of the present invention relate to a bicycle frame and more particularly to a bike frame with a fixed bottle opener gusset as used to improve the frame strength for rugged service, reduced wind resistance, and extended service life, while providing for a functional bottle opener.

Generally speaking, bike frame with a fixed bottle opener gusset is a bicycle frame comprising a rigid frame including at least a crossbar having a cross-section, a vertical frame-bar, and a fixed bottle opener gusset fixedly and integrally located at an intersection of the crossbar and the vertical frame-bar. The rigid frame supports a steering sub-assembly for manipulatable movement of the cycle. The bottle opener gusset functional as a bottle opener for removing a bottle cap via at least one tooth adapted to catch a bottle cap edge of the bottle cap for opening a bottle such that a user can open the bottle, drink contents held therein and operate the cycle.

In one embodiment, the tube frame may comprise a downwardly curved design for added mechanical strength. Other tube-members of the frame have an elongated elliptical cross-section for increased strength and impact damage resistance. The design of the frame provides added strength and increased frame life with rugged service, while providing a fixed functional bottle opener.

It should be noted and understood that the bike frame of the cycle may comprise a top tube and a seat post tube and the fixed bottle opener gusset may be integrally positioned at the intersection of the top tube and the seat post tube. Further, the bike frame may comprise a seat post tube and a down tube and the fixed bottle opener gusset may be integrally positioned at the intersection of the bottom tube and the seat post tube. The bottle opener may also be positioned at the intersection of the top tube and the down tube.

It should further be noted that the fixed bottle opener gusset has two separate and distinct functions. One function is to support the strength and rigidity of the bike frame of the cycle. The second function is that of a bottle opener that is conveniently and fixedly located on the cycle.

In one embodiment of the present invention, the cross-section of the crossbar is non-tubular. In other embodiments of the present invention, the cross-section of the crossbar is tubular.

Preferably, the fixed bottle opener gusset is welded such that the fixed bottle opener gusset is fixedly and integrally located at the intersection of the crossbar and the vertical frame-bar via at least two welds. The positioning of the bottle opener gusset on the bike frame, and the fixed nature of the bottle opener, provides stability to the bike frame for durability, and leverage when removing a bottle cap from a bottle. Further, the fixed bottle opener gusset is located beneath the user such that when riding the cycle is able to open the bottle with relative ease so as not to compromise riding operation of the cycle. The intersection of the crossbar and the vertical frame-bar is located on a plane lower than a seat of the cycle.

Figure 1B:
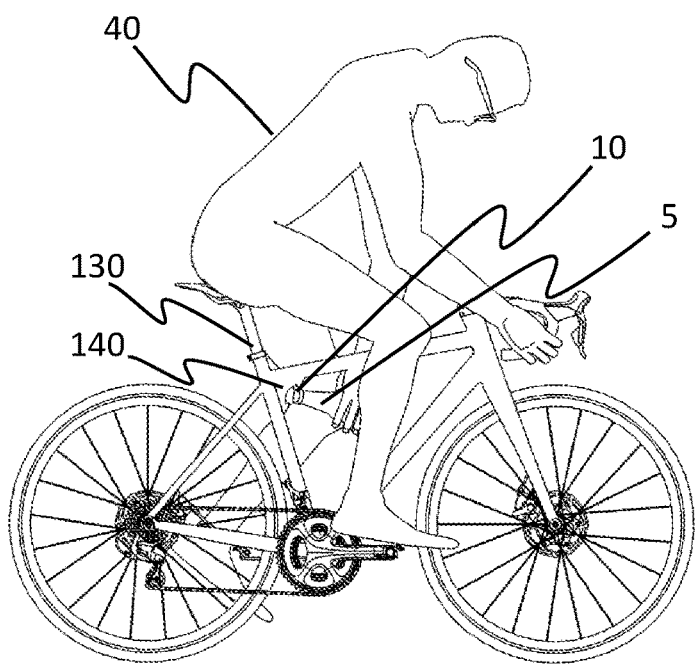
FIG. 1B shows another perspective view of a user utilizing the fixed bottle opener gusset to remove a bottle cap from a bottle while operating the bicycle according to an embodiment of the present invention of FIG. 1A.

Referring to the drawings by numerals of reference there is shown in FIG. 1A, a perspective view illustrating 'in-use' condition 50 of bike frame with bottle opener gusset 100 according to an embodiment of the present invention. As shown, the bike frame with fixed bottle opener gusset 100 is usable as a mode of transportation. In one embodiment, the cycle 105 comprises a beach-cruiser. In other embodiments, the cycle 105 comprises a non-beach-cruiser. Referring to FIG. 1B showing a user 40 utilizing the fixed bottle opener gusset 140 to remove a bottle cap 10 from a bottle 5 while operating the cycle 105 according to an embodiment of the present invention of FIG. 1A.

Figure 2:
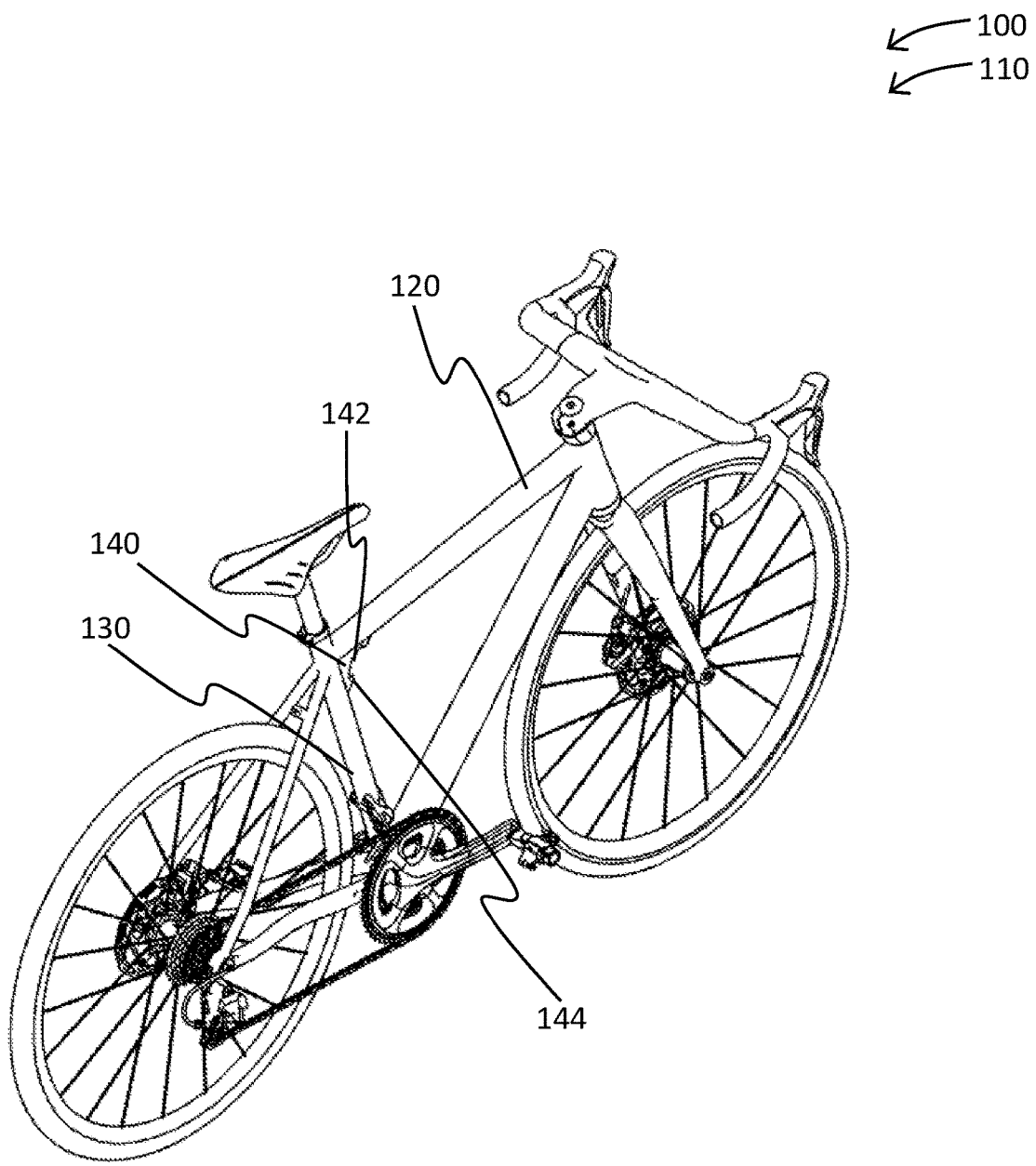
FIG. 2 shows a perspective view of the cycle having the fixed bottle opener gusset according to an embodiment of the present invention.

Referring now to FIG. 2 showing a perspective view of the cycle 105 having the fixed bottle opener gusset 140 according to an embodiment of the present invention. As shown, a cycle frame system 100 may comprise a rigid frame 110 including at least a crossbar 120 having a cross-section 122, a vertical frame-bar 130; and a fixed bottle opener gusset 140 fixedly and integrally located at an intersection of the crossbar 120 and the vertical frame-bar 130. As may be seen, the rigid frame 110 supports a steering sub-assembly for manipulatable movement of the cycle 105, and the fixed bottle opener gusset 140 is functional as a bottle opener 142 for removing a bottle cap 10 via at least one tooth 144 adapted to catch a bottle cap edge of the bottle cap 10 for opening a bottle 5 such that a user 40 is able to open the bottle 5, drink contents held therein, and operate the cycle 105 simultaneously.

Figure 3:
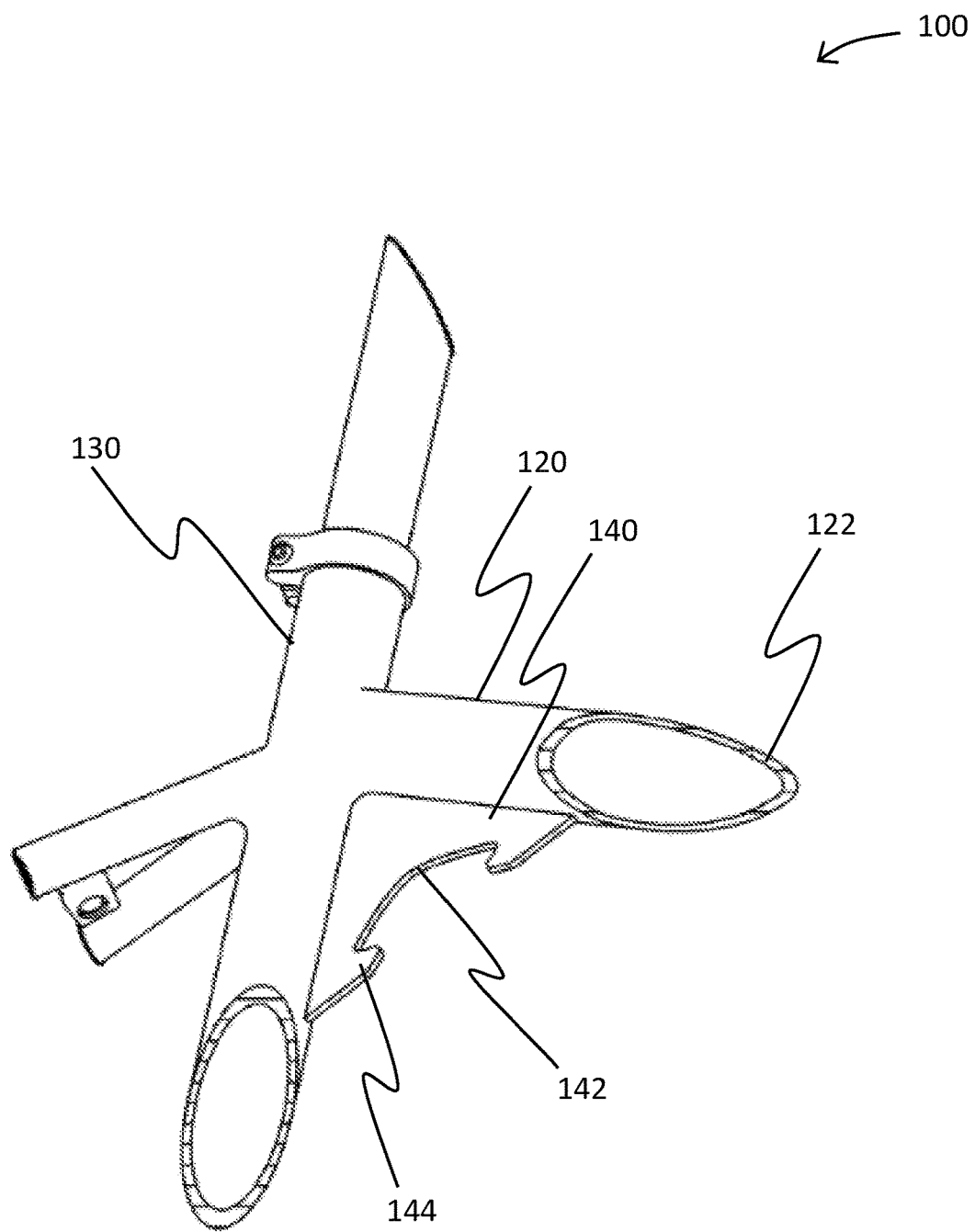
FIG. 3 shows a close-up view of the fixed bottle opener gusset fixedly and integrally located at an intersection of a crossbar and a vertical frame-bar of the bike frame according to an embodiment of the present invention.
Figure 4A:
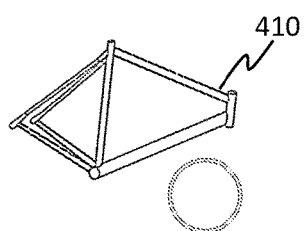
FIG. 4A shows a perspective view of a tube frame comprising a tubular profile according an embodiment of the present invention.
Figure 4B:
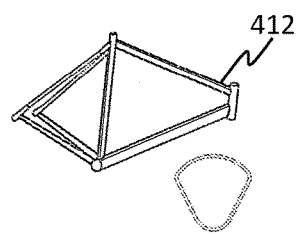
FIG. 4B shows a perspective view of a tube frame comprising a substantially rounded triangular profile according an embodiment of the present invention.
Figure 4C:
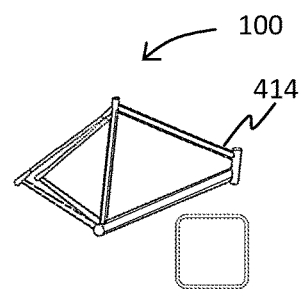
FIG. 4C shows a perspective view of a tube frame comprising a substantially square profile according an embodiment of the present invention.
Figure 4D:
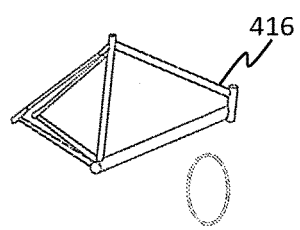
FIG. 4D shows a perspective view of a tube frame comprising a substantially oval profile according an embodiment of the present invention.
Figure 4E:
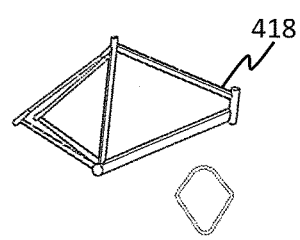
FIG. 4E shows a perspective view of a tube frame comprising a substantially rounded diamond profile according an embodiment of the present invention.
Figure 4F:
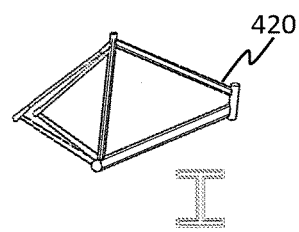
FIG. 4F shows a perspective view of a tube frame comprising an "I" shaped profile according an embodiment of the present invention.
Figure 4G:
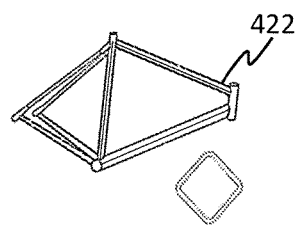
FIG. 4G shows a perspective view of a tube frame comprising a diamond shaped profile according an embodiment of the present invention.
Figure 4H:
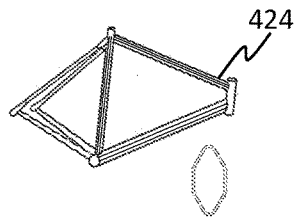
FIG. 4H shows a perspective view of a tube frame comprising a hexagonal shaped profile according an embodiment of the present invention.
Figure 4I:
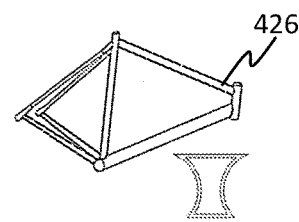
FIG. 4I shows a perspective view of a tube frame comprising a substantially concave "I" shaped profile according an embodiment of the present invention.
Figure 4J:
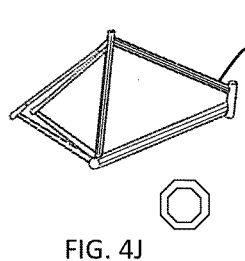
FIG. 4J shows a perspective view of a tube frame comprising a substantially octagonal shaped profile according an embodiment of the present invention.
Figure 4K:
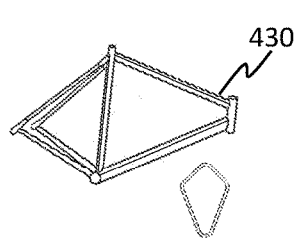
FIG. 4K shows a perspective view of a tube frame comprising a cone shaped profile according an embodiment of the present invention.
Figure 4L:
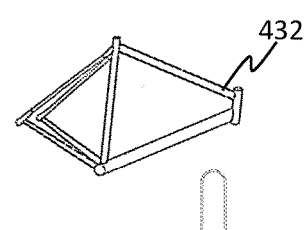
FIG. 4L shows a perspective view of a tube frame comprising a substantially rounded rectangular shaped profile according an embodiment of the present invention.

Referring now to FIG. 3 showing a close-up view of the fixed bottle opener gusset 140 fixedly and integrally located at the intersection of the crossbar 120 and the vertical frame-bar 130 of the rigid frame 110 according to an embodiment of the present invention. In one embodiment, the fixed bottle opener gusset 140 may be welded such that the fixed bottle opener gusset 140 is fixedly and integrally located at the intersection of the crossbar 120 and the vertical frame-bar 130 via at least two welds.

As shown best in FIGS. 1B and 3, the fixed bottle opener gusset 140 is located beneath the user 40 such that when the user 40 is riding the cycle 105, the user 40 is able to open the bottle 5 with relative ease so as not to compromise riding operation of the cycle 105.

Referring to FIGS. 4A-4L showing various examples of rigid frames 110 having the fixed bottle opener gusset 140 integrally installed thereto. As shown, the tubing of the rigid frame 110 of the cycle 105 may comprise any of the following types and forms: tubular profile 410; substantially rounded triangular profile 412; substantially square profile 414; substantially oval profile 416; substantially rounded diamond profile 418; "I" shaped profile 420; diamond shaped profile 422; hexagonal shaped profile 424; substantially concave "I" shaped profile 426; substantially octagonal shaped profile 428; cone shaped profile 430; and substantially rounded rectangular shaped profile 432. Other embodiments and styles are contemplated.

Preferably, the bottle opener 142 of the fixed bottle opener gusset 140 is non-removable from the rigid frame 110. However, it should be appreciated that in other embodiments, the rigid frame 110 may comprise a bottle opener gusset 140 whereby the bottle opener 142 is removable.

It should be noted that a variety of bottle opener variations and embodiments have been contemplated. In one embodiment, the bottle opener has exactly two teeth. In other embodiments, the bottle opener may comprise a plurality of teeth such that the bottle cap can be removed from the bottle from a variety of angles and orientations by the user.

It should be noted that the steps described in the method of use may be carried out in many different orders according to user preference. The use of "step of" should not be interpreted as "step for", in the claims herein and is not intended to invoke the provisions of 35 U.S.C. § ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements may be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A cycle frame system comprising:
   a rigid frame including at least;
   a crossbar having a cross-section;
   a vertical frame-bar; and
   a fixed bottle opener gusset fixedly and integrally located at an intersection of said crossbar and said vertical frame-bar;
   wherein said rigid frame supports a steering sub-assembly for manipulatable movement of said cycle, said bottle opener gusset functional as a bottle opener for removing a bottle cap via at least one tooth adapted to catch a bottle cap edge of said bottle cap for opening a bottle such that a user can open said bottle, drink contents held therein and operate said cycle.

2. The cycle frame system of claim 1 wherein said cross-section of said crossbar is non-tubular.

3. The cycle frame system of claim 1 wherein said cross-section of said crossbar is tubular.

4. The cycle frame system of claim 1 wherein said fixed bottle opener gusset is welded such that said fixed bottle opener gusset is fixedly and integrally located at the intersection of said crossbar and said vertical frame-bar via at least two welds.

5. The cycle frame system of claim 4 wherein said fixed bottle opener gusset is located beneath said user such that when riding said cycle is able to open said bottle with relative ease so as not to compromise riding operation of said cycle.

6. The cycle frame system of claim 1 wherein said cycle comprises a beach-cruiser.

7. The cycle frame system of claim 1 wherein said cycle comprises a non-beach-cruiser.

8. The cycle frame system of claim 5 wherein said intersection of said crossbar and said vertical frame-bar is located on a plane lower than a seat of said cycle.

9. The cycle frame system of claim 1 wherein said cross-section of said crossbar is oval.

10. The cycle frame system of claim 1 wherein said cross-section of said crossbar is substantially hexagonal.

11. The cycle frame system of claim 1 wherein said cross-section of said crossbar is substantially octagonal.

12. The cycle frame system of claim 1 wherein said fixed bottle opener gusset is permanently non-removable from said rigid frame.

13. The cycle frame system of claim 1 wherein said bottle opener has exactly 2 teeth.

14. The cycle frame system of claim 1, wherein said bottle opener has a plurality of teeth for manipulating and removing said bottle cap from at least two angles.

15. The cycle frame system of claim 1 wherein said rigid frame comprises a shape from the following group: a tubular profile; a substantially rounded triangular profile; a substantially square profile; a substantially oval profile; a substantially rounded diamond profile; an "I" shaped profile; a diamond shaped profile; a hexagonal shaped profile; a substantially concave "I" shaped profile; a substantially octagonal shaped profile; a cone shaped profile; and a substantially rounded rectangular shaped profile.

16. A cycle frame system comprising:
   a rigid frame including at least;
   a first frame-bar having a cross-section;
   a second frame-bar; and
   a fixed bottle opener gusset fixedly and integrally located at an intersection of said first frame-bar and said second frame-bar;
   wherein said rigid frame supports a steering sub-assembly for manipulatable movement of said cycle, said bottle opener gusset functional as a bottle opener for removing a bottle cap via at least one tooth adapted to catch a bottle cap edge of said bottle cap for opening a bottle such that a user can open said bottle, drink contents held therein and operate said cycle.

17. The cycle frame system of claim 16 wherein said fixed bottle opener gusset is welded such that said fixed bottle opener gusset is fixedly and integrally located at the intersection of said crossbar and said vertical frame-bar via at least two welds.

18. The cycle frame system of claim 17 wherein said fixed bottle opener gusset is located beneath said user such that when riding said cycle is able to open said bottle with relative ease so as not to compromise riding operation of said cycle.

19. The cycle frame system of claim 18 wherein said intersection of said crossbar and said vertical frame-bar is located on a plane lower than a seat of said cycle.

20. The cycle frame system of claim 16, wherein said bottle opener has a plurality of teeth for manipulating and removing said bottle cap from at least two angles.

\* \* \* \* \*